US011643867B2

(12) United States Patent
Onodera et al.

(10) Patent No.: US 11,643,867 B2
(45) Date of Patent: May 9, 2023

(54) GAS TRAPPING MEMBER AND VACUUM HEAT INSULATION EQUIPMENT

(71) Applicant: Panasonic Corporation, Osaka (JP)

(72) Inventors: Taigo Onodera, Tokyo (JP); Takashi Naito, Tokyo (JP); Tatsuya Miyake, Tokyo (JP); Takuya Aoyagi, Tokyo (JP); Shinichi Tachizono, Tokyo (JP); Yuji Hashiba, Tokyo (JP); Takahiro Ikabata, Tokyo (JP)

(73) Assignee: Panasonic Holdings Corporation, Osaka (JP)

( * ) Notice: Subject to any disclaimer, the term of this patent is extended or adjusted under 35 U.S.C. 154(b) by 0 days.

(21) Appl. No.: 16/695,970

(22) Filed: Nov. 26, 2019

(65) Prior Publication Data

US 2020/0165863 A1 May 28, 2020

(30) Foreign Application Priority Data

Nov. 26, 2018 (JP) .............................. JP2018-220209

(51) Int. Cl.
*E06B 3/67* (2006.01)
*B01J 20/02* (2006.01)
(Continued)

(52) U.S. Cl.
CPC ......... *E06B 3/6715* (2013.01); *B01J 20/0233* (2013.01); *B01J 20/06* (2013.01);
(Continued)

(58) Field of Classification Search
CPC ............. E06B 3/66333; E06B 3/66631; E06B 3/6715; E06B 3/6736; E06B 2003/66338; E06B 3/6612; E06B 3/66361; E06B 3/6733; B01J 20/0233; B01J 20/06; B01J 20/28059; B01J 20/28095; B01J 20/28083; B01J 2220/42; B01J 20/28057; B01J 20/28069; B01J 20/02; B01J 20/08; B01J 20/103; B32B 2250/40; B32B 17/10055; B01D 2253/1122; B01D 53/02;
(Continued)

(56) References Cited

U.S. PATENT DOCUMENTS 6,027,797 A 2/2000 Watanabe et al.
2008/0283446 A1* 11/2008 Tatarchuk .......... B01J 20/28078
208/246

(Continued)

FOREIGN PATENT DOCUMENTS

CN 105570618 A 5/2016
CN 106470938 A 3/2017
(Continued)

*Primary Examiner* — Brian Handville
(74) *Attorney, Agent, or Firm* — Renner, Otto, Boisselle & Sklar, LLP

(57) ABSTRACT

There is provided a gas trapping material and vacuum heat insulation equipment where the gas trapping material can be activated in a sealing step of the vacuum heat insulation equipment, and production efficiency can be enhanced by maintaining a high gas trapping characteristic even when a gas is released in a baking step or in a sealing step under an air atmosphere. The gas trapping material contains porous metal oxide and silver particles having an average particle size of 0.5 nm to 100 nm inclusive.

7 Claims, 11 Drawing Sheets

(51) Int. Cl.
- *B01J 20/06* (2006.01)
- *B01J 20/28* (2006.01)
- *B32B 17/10* (2006.01)
- *C03C 3/12* (2006.01)
- *E06B 3/663* (2006.01)

(52) U.S. Cl.
CPC ... *B01J 20/28059* (2013.01); *B01J 20/28083* (2013.01); *B01J 20/28095* (2013.01); *B32B 17/10055* (2013.01); *C03C 3/122* (2013.01); *E06B 3/66333* (2013.01); *B01D 2253/1122* (2013.01); *B01J 2220/42* (2013.01); *B32B 2250/40* (2013.01)

(58) Field of Classification Search
CPC ........ B01D 2257/104; B01D 2257/504; C03C 3/122; C03C 8/02; C03C 8/14; C03C 8/24; C03C 27/10; Y02A 30/249; Y02B 80/22; Y02C 20/40
See application file for complete search history.

(56) References Cited

U.S. PATENT DOCUMENTS

| | | |
|---|---|---|
| 2009/0105069 A1 | 4/2009 | Kayama et al. |
| 2009/0209415 A1* | 8/2009 | Kayama .................. B01J 37/03 |
| | | 502/304 |
| 2010/0126909 A1* | 5/2010 | Bhasin ................. B01J 20/3236 |
| | | 208/135 |
| 2014/0178626 A1 | 6/2014 | Min et al. |
| 2017/0107753 A1 | 4/2017 | Koga et al. |

FOREIGN PATENT DOCUMENTS

| | | |
|---|---|---|
| CN | 106732326 A | 5/2017 |
| CN | 107893611 A | 4/2018 |
| JP | 2004-305869 A | 11/2004 |
| JP | 2007-313451 A | 12/2007 |
| JP | 2014-100655 A | 6/2014 |
| WO | 2007/116715 A1 | 10/2007 |
| WO | 2016/017709 A1 | 2/2016 |
| WO | 2016/051788 A1 | 4/2016 |

* cited by examiner

GAS TRAPPING MEMBER AND VACUUM HEAT INSULATION EQUIPMENT

CLAIM OF PRIORITY

The present application claims priority from Japanese Patent application serial No. 2018-220209, filed on Nov. 26, 2018, the content of which is hereby incorporated by reference into this application.

TECHNICAL FIELD

The present invention relates to a gas trapping material and vacuum heat insulation equipment.

BACKGROUND OF THE INVENTION

A gas trapping material is used for maintaining heat insulation property of vacuum heat insulation equipment where high heat insulation performance is required (for example, a construction member-use window glass, a business use refrigerator, a door of freezer, a heat insulation layer of a water bottle or an electric pot, a window member for transport facility such as a vehicle or a ship). Recently, in view of a worldwide trend of seeking for energy saving and reduction of $CO_2$ emission, enhancement of heat insulation property and durability of a heat insulation layer is requested.

Of vacuum heat insulation equipment, energy saving of a building has been rapidly advancing to satisfy regulations or the like stipulated by laws, and a demand for a vacuum multi-layered glass which is a window glass which exhibits excellent heat insulation performance has been increased. The vacuum multi-layered glass has the structure where a gas in a space formed by oppositely facing plate glasses (hereinafter referred to as "gap portion" is evacuated and hence, heat conduction by the gas is suppressed whereby heat insulation property is enhanced. On the other hand, when a vacuum multi-layered glass is used for a long period, there arises a drawback that a gas is released from the glass plates and a sealing material which seals oppositely facing glass plates and hence, a degree of vacuum of the gap portion is lowered whereby heat insulation property is lowered. In view of the above, conventionally, a gas trapping material is disposed in the gap portion for the purpose of maintaining heat insulation property by trapping a discharged gas from the glass plates and the sealing material.

WO 2016/051788 discloses, as a conventional gas trapping material, a gas adsorption body formed of: a substrate formed of fibrous or porous body made of an inorganic material; and a liquid containing a getter which adheres to the substrate.

WO 2016/017709 discloses a method of manufacturing a vacuum multi-layered glass which includes: a step where an assembly which includes a first glass plate, a second glass plate, a sealing material, and a getter material is assembled; a step where a conveyance cart for conveying the assembly is carried in a heating furnace; and a step where, in a pressure-reduced space in the heating furnace, the assembly is heated and hence, the sealing material is melted and the getter material is activated and, thereafter, the sealing material is solidified and hence, the first glass plate and the second glass plate are bonded to each other by the sealing material and a pressure-reduced space formed between the first glass plate and the second glass plate is sealed by the sealing material in a state where the sealing material contains the getter material, and a gas in the pressure-reduced space is adsorbed by the getter material.

SUMMARY OF THE INVENTION

In the invention described in WO 2016/051788, the vacuum multi-layered glass includes two plate glasses which form a multi-layered glass, a gap portion formed between two plate glasses, and a gas trapping material disposed in the gap portion, and the gas trapping material is formed by obtaining a solution by dissolving an adsorption material into a solvent, by applying the solution to one plate glass by coating, and by drying the solution. In such a manufacturing method, it is necessary to adjust viscosity of the solution for forming a gas trapping material having an accurate and desired shape (width). Accordingly, such a manufacturing method uses a solvent which is hardly volatile at a room temperature. Further, the solvent is requested to minimally lower a gas trapping ability of the gas trapping material and hence, a range of selection of the solvent is narrow. Further, the gas trapping material having a desired shape may not be obtained or the number of steps such as preparation, coating, and drying of the gas trapping material is large and hence, the manufacturing method has a drawback in productivity.

The invention described in WO 2016/017709 discloses the method where the getter material is disposed in a recessed portion formed on the glass plate on a side where the gap portion is formed by the oppositely facing glasses. However, the method has the following drawbacks. That is, time and efforts are necessary for preliminarily forming the recessed portion on the glass plate, and durability of the glass plate is lowered due to the formation of the recessed portion.

In view of the above, there has been a demand for a gas trapping material which can be manufactured with high productivity and can be easily installed. As the gas trapping material to be installed, in general, a non-volatile-type gas trapping material is used. Specifically, a porous sintered body made of at least one kind of metal selected from a group of Ti, Zr, Hf, V, Fe, Al, Cr, Nb, Ta, W, Mo, Ni, Mn, and Y or an alloy of these metals is used. It is necessary to activate these gas trapping materials by local heating or the like, and a heating temperature is 350° C. or above. However, from a viewpoint of prevention of breaking caused by the increase of a degree of vacuum, securing of safety, prevention of crimes and the like, there has been a demand for the use of a hard-to-break reinforced glass which is formed by applying treatment for coping with wind and coldness to a panel glass. A strength of such a reinforced glass is increased by forming a compression reinforced layer on a surface of the reinforced glass. However, an amount of the reinforced layer is gradually decreased at a heating temperature of approximately 320° C. or above, and is extinguished at a heating temperature of approximately 400° C. or above. Accordingly, it is desirable that a sealing temperature of the glass panel be 300° C. or below. It is also desirable that activation of a gas trapping material is performed simultaneously with sealing of the glass from a viewpoint of manufacturing efficiency and hence, it is desirable that activation of the gas trapping material can be performed at a temperature of 300° C. or below in conformity with a sealing temperature of the glass.

In the sealing step of the glass, a glass paste for sealing is applied by coating to one of a pair of glass plates which forms a glass panel and is dried and, thereafter, one glass panel is formed by making the pair of glass plates overlap with each other. Then, sealing is performed by provisional baking and main baking in two stages while evacuating a gas. In this case, under reduced pressure in a vacuum evaluation state, the elevation of temperature and cooling require time compared to such operations under an atmospheric pressure. Accordingly, the elevation of temperature and cooling under the reduced pressure in a vacuum evaluation state is not desirable from a viewpoint of manufacturing efficiency, and it is desirable to perform provisional baking under an air atmosphere from a viewpoint of enhancing manufacturing efficiency. However, a currently used gas trapping material is activated along with the elevation of temperature when a provisional baking step is performed in an air atmosphere and hence, the gas trapping material traps a gas component in the atmosphere thus giving rise to a concern that trapping of a released gas in the panel after sealing becomes difficult.

Accordingly, there has been a demand for the realization of a gas trapping material which can maintain activation even when a temperature is lowered in a sealing step or baking step is performed in an air atmosphere. In the manufacture of a vacuum heat insulation multi-layered glass panel where rapid heating and rapid cooling are difficult, the realization of such a gas trapping material can shorten a manufacturing takt, and can reduce an investment cost at the time of introducing a mass production facility and hence, a glass panel containing a gas trapping material can be manufactured at a low cost whereby popularization of a gas trapping material throughout the world can be easily realized. Accordingly, such a gas trapping material can reduce an amount of $CO_2$ emission and is expected to contribute to prevent global warming.

As has been described above, in vacuum heat insulation equipment such as a vacuum heat insulation multi-layered glass panel or the like, there has been a strong demand for a gas trapping material which can maintain activation along with a sealing step where higher heat insulation under higher vacuum is requested, lowering of a sealing temperature is requested, and a sealing operation in air atmosphere is demanded.

The present invention has been made in view of the abovementioned drawbacks, and it is an object of the present invention to provide a gas trapping material and vacuum heat insulation equipment where the gas trapping material can be activated at a low temperature of 300° C. or below, and production efficiency can be enhanced by maintaining a high gas trapping characteristic even when a gas is released in a baking or sealing step under an air atmosphere.

To solve the abovementioned drawbacks, according to an aspect of the present invention, there is provided a gas trapping material containing porous metal oxide and silver particles having an average particle size of 0.5 nm to 100 nm inclusive.

To achieve the abovementioned object, according to another aspect of the present invention, there is provided vacuum heat insulation equipment in which the abovementioned gas trapping material is disposed.

The more specific configurations of the present invention are described in the scope of claims.

According to the present invention, it is possible to provide a gas trapping material and vacuum heat insulation equipment where the gas trapping material can be activated at a low temperature of 300° C. or below, and even when a gas is released from a gap portion in a baking or sealing step in an air atmosphere, a high gas trapping characteristic can be maintained whereby production efficiency can be enhanced.

Objects, configurations, and advantageous effects other than the abovementioned objects, configurations, and advantageous effects will become apparent by the description of an embodiment made hereinafter.

DETAILED DESCRIPTION

Hereinafter, an embodiment of the present invention is described with reference to drawings and the like. The description made hereinafter describes specific examples of the content of the present invention. The present invention is not limited by such description, and various changes and modifications are conceivable by those who are skilled in the art within a scope of a technical concept disclosed in this specification. Further, in all drawings used for describing the present invention, there may be a case where constitutional elements having the same functions are given the same symbols, and the repeated description of these constitutional elements is omitted.

Figure 1A:
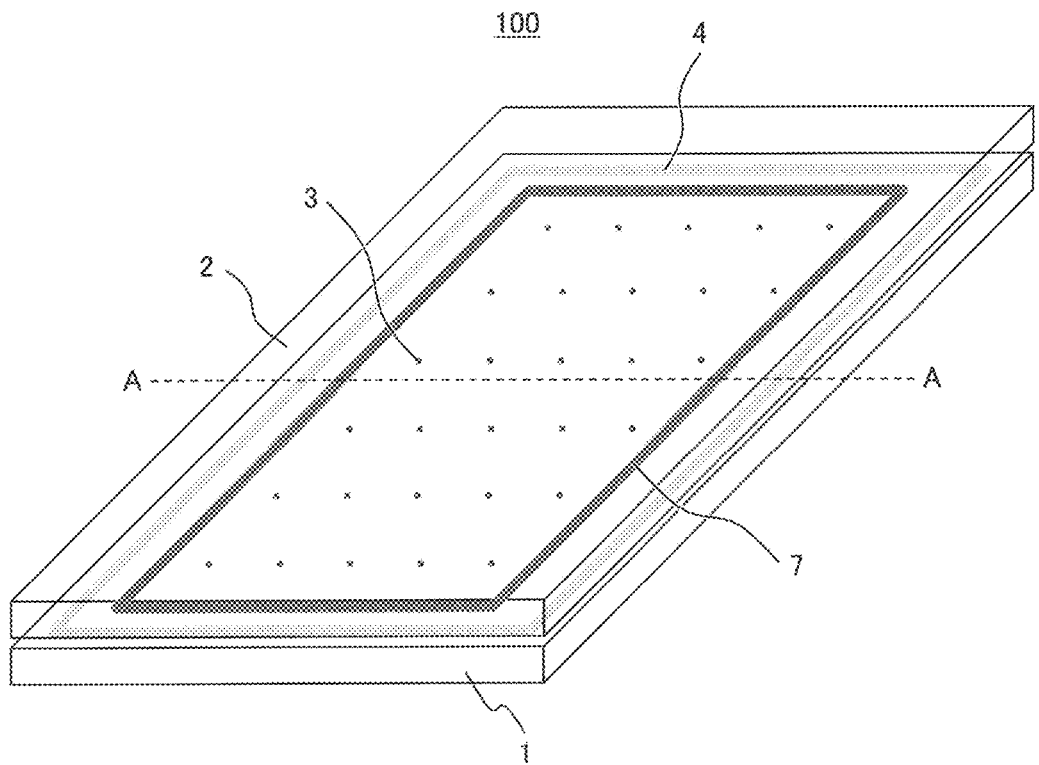
FIG. 1A is a schematic perspective view of a vacuum heat insulation multi-layered glass panel to which the present invention is applied.
Figure 1B:
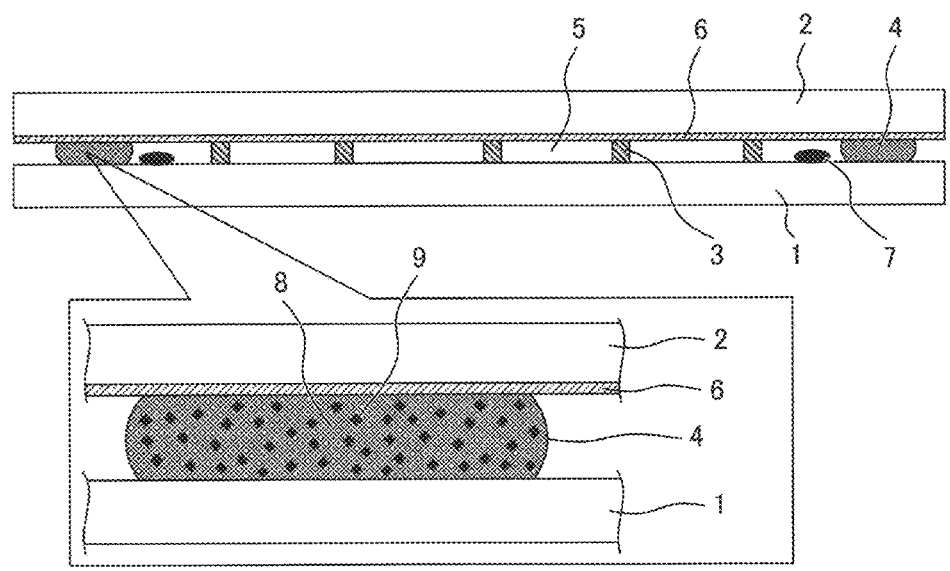
FIG. 1B is a cross-sectional view taken along line A-A in FIG. 1A and also is an enlarged cross-sectional view of a sealing portion of the vacuum heat insulation multi-layered glass panel.

Firstly, one example of vacuum heat insulation equipment in which a gas trapping material is installed is described. FIG. 1A is a schematic perspective view of a first example of a vacuum heat insulation multi-layered glass panel to which the present invention is applied, and FIG. 1B is a cross-sectional view taken along line A-A in FIG. 1A and also is an enlarged cross-sectional view of a sealing portion of the vacuum heat insulation multi-layered glass panel. As shown in FIG. 1A and FIG. 1B, the vacuum heat insulation multi-layered glass panel 100 includes: a first substrate (glass substrate) 1; a second substrate (glass substrate) 2 disposed in an opposely facing manner with the first substrate 1 with a space formed therebetween; a sealing portion 4 disposed on a periphery of a gap portion 5 formed between the first substrate 1 and the second substrate 2; and a gas trapping material 7 disposed in the gap portion 5. The gap portion 5 formed by the first substrate 1 and the second substrate 2, and the sealing portion 4 is in a vacuum state. In this specification, "vacuum state" means a state where a pressure is lower than an atmospheric pressure. A plurality of spacers 3 are disposed in the gap portion 5. Since the gap portion 5 of the vacuum heat insulation multi-layered glass panel 100 is in a vacuum state, a pressure difference occurs between an atmospheric pressure and a pressure in the gap portion 5. However, the gap portion 5 can be maintained by disposing the spacers 3 in the gap portion 5.

By disposing the gas trapping material 7 in the gap portion 5, a $CO_2$ gas, moisture and the like released from the respective members can be trapped. As a result, a high vacuum state in the gap portion 5 can be maintained and hence, heat insulation property of the vacuum heat insulation multi-layered glass panel 100 can be maintained.

As shown in an enlarged view in FIG. 1B, in general, the sealing portion 4 contains a low-melting point glass 8 and low thermal expansion filler particles 9. The low thermal expansion filler particles 9 are dispersed in the low-melting point glass 8. A vacuum state in the gap portion 5 is realized by the sealing portion 4, and the vacuum state is maintained for a long period. The low thermal expansion filler particles 9 are mixed into the low-melting point glass 8 so as to make a thermal expansion coefficient of the sealing portion 4 agree with a thermal expansion coefficient of the first glass substrate 1 and the second glass substrate 2.

A heat reflecting film 6 having a heat blocking function is disposed on a surface of the second substrate 2 on a gap portion 5 side. The heat reflecting film 6 is useful in the case where the vacuum heat insulation multi-layered glass panel 100 is applied to a construction member-use window glass, and is used in general.

In such a vacuum heat insulation multi-layered glass panel 100, a sealing temperature is substantially decided based on a softening fluidity characteristic corresponding to a heating temperature of the low-melting point glass 8 used in the sealing portion 4. That is, the lower a softening point of the low-melting point glass 8 becomes, the lower a sealing temperature can be made. On the other hand, however, there is a tendency that in proportion to lowering of a softening point of the low-melting point glass 8, a mechanical strength of the low-melting point glass 8 is lowered. Further, in this case, there is a tendency that a thermal expansion coefficient of the low-melting point glass 8 is increased. To overcome such problems, it is necessary to increase the volume content of the low thermal expansion filler particles 9 contained in the sealing portion 4.

Figure 2:
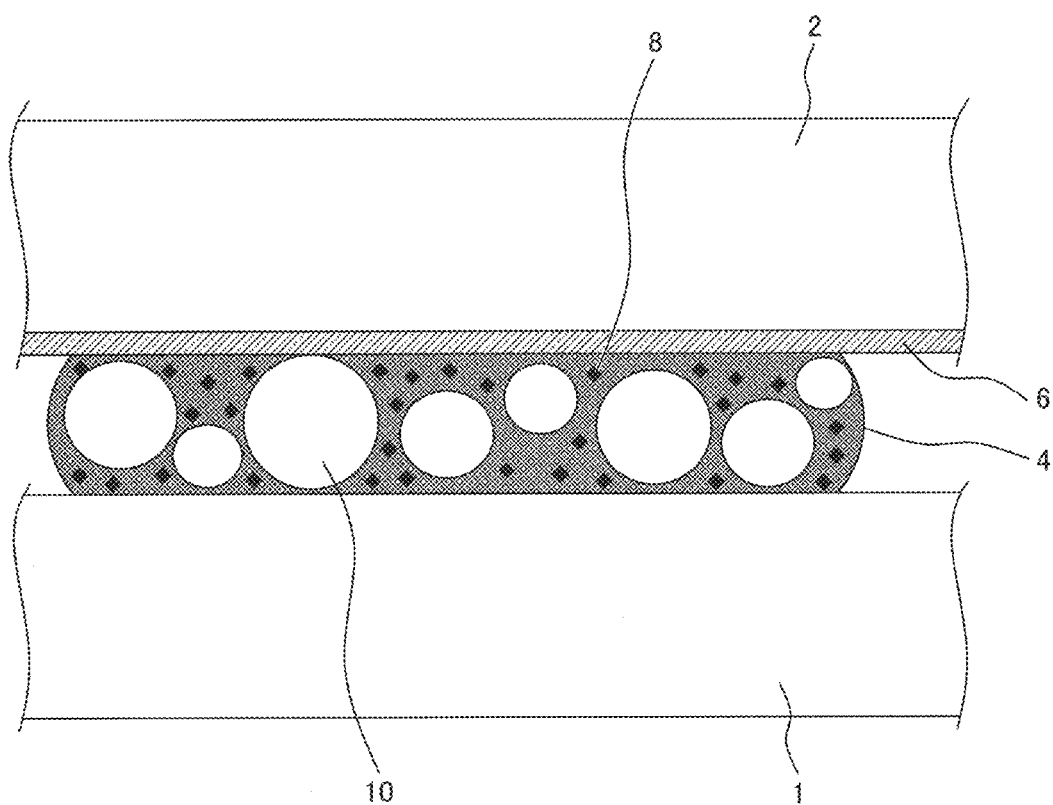
FIG. 2 is a cross-sectional view of a sealing portion and a periphery of the sealing portion of a vacuum heat insulation multi-layered glass panel according to an embodiment of the present invention.

FIG. 2 is a schematic perspective view of another example of a vacuum heat insulation multi-layered glass panel to which the present invention is applied, and is a view showing a sealing portion 4 and a periphery of the sealing portion 4 in an enlarged manner. A point which makes FIG. 2 different from the enlarged view in FIG. 1B is that spherical glass beads 10 are also dispersed in a low-melting point glass 8. The low-melting point glass 8 (lead-free low-melting point glass) contains vanadium oxide ($V_2O_5$) and tellurium oxide ($TeO_2$). Due to such composition, a sealing temperature can be set to a value below 400° C.

The volume content of the glass beads 10 is 10% to 35% inclusive. The volume content of the low-melting point glass 8 is larger than the volume content of the low thermal expansion filler particles 9.

By setting the volume content of the glass beads 10 to the abovementioned value, cohesive failure in the sealing portion 4 can be prevented and hence, a mechanical strength of the sealing portion 4 can be enhanced. Accordingly, reliability of the vacuum heat insulation multi-layered glass panel 100 can be ensured. When the volume content of the glass beads 10 is less than 10%, a mechanical strength of the sealing portion 4 can be hardly enhanced. On the other hand, when the volume content of the glass beads 10 exceeds 35%, the sealing portion 4 is easily peeled off from an interface between the sealing portion 4 and the first glass substrate 1 and an interface between the sealing portion 4 and the second glass substrate 2. It is more preferable to set the volume content of the glass beads 10 to a value which falls within a range of from 20% to 30% inclusive.

With respect to a size of the glass bead 10, it is necessary that a maximum diameter of the glass bead 10 is equal to or less than a distance between the first substrate 1 and the second substrate 2. An average diameter ($D_{50}$) of the glass bead is preferably half or more of the distance. In this embodiment, the average diameter ($D_{50}$) is a median diameter, and is also referred to as "average particle size". In the present invention, firstly, glass beads 10 are classified by a sieve and, thereafter, an average diameter ($D_{50}$) is measured using a Laser Scattering Particle Size Distribution Analyzer LA-950V2 made by HORIBA Instruments, Inc.

The glass beads 10 are preferably made of a glass-based material equal to or similar to a glass-based material for forming the first substrate 1 and the second substrate 2. It is because the glass beads 10 have the same or similar thermal expansion characteristic as the first substrate 1 and the second substrate 2 and hence, it is possible to enhance a mechanical strength of the sealing portion in a stable manner. To be more specific, it is preferable to use glass beads made of soda-lime glass ($SiO_2$—$Na_2O$—$CaO$ based glass), borosilicate glass ($SiO_2$—$B_2O_3$—$Na_2O$ based glass), quartz glass ($SiO_2$) or the like.

In this specification, "glass bead" is defined as approximately spherical glass. In the vacuum heat insulation multi-layered glass panel, the low thermal expansion filler particles 9 are introduced for making the thermal expansion of the sealing portion 4 agree with the thermal expansion of the first substrate 1 and the second substrate 2. On the other hand, when the volume content of the low thermal expansion filler particles 9 is equal to or more than the abovementioned volume content of the low-melting point glass 8, a softening fluidity property of the low-melting point glass 8 at the time of sealing by heating is lowered and hence, it is difficult to provide hermetic sealing. Accordingly, it is necessary to set the volume content of the low-melting point glass 8 larger than the volume content of the low thermal expansion filler particles 9. The volume content of the low-melting point glass 8 is more preferably 35% or more. Such a volume content is effective for making the thermal expansion of the sealing portion 4 agree with the thermal expansion of the first substrates 1 and the second substrate 2. Further, the volume content of the low-melting point glass 8 is preferably 72% or less.

The vacuum heat insulation multi-layered glass panel 100 according to this embodiment possesses excellent heat insulation property, mass productivity, and reliability and hence, the vacuum heat insulation multi-layered glass panel 100 is particularly effectively applicable to construction member-use window glass. Further, the use of the vacuum heat insulation multi-layered glass panel 100 can be widely spread throughout the world in the residential field, architectural field and the like. Accordingly, a use amount of energy can be reduced and hence, a $CO_2$ emission amount can be lowered whereby the vacuum heat insulation multi-layered glass panel 100 can contribute to countermeasures against global warming. Further, the vacuum heat insulation multi-layered glass panel is also applicable to fields other than construction member-use window glass. For example, the vacuum heat insulation multi-layered glass panel is widely applicable to parts or products where heat insulation property is required such as vehicle-use window glass, a door of a business use refrigerator or a freezer.

The substrates, the spacers, the sealing portion, the gas trapping material which form the vacuum heat insulation equipment according to the embodiment of the present invention are described in detail.

<First Substrate and Second Substrate>

The first substrate 1 and the second substrate 2 of the vacuum heat insulation multi-layered glass panel 100 may be formed using a float plate glass, a figured glass, a frosted glass, a reinforced glass, a meshed wire plate glass, a wire plate glass or the like. Reinforcing treatment against wind and coldness or chemical reinforcing treatment may be applied to these substrates. With the use of a reinforced glass to which reinforcing treatment against wind and coldness or chemical reinforcing treatment is applied, the number of spacers 3 can be reduced. When the spacers 3 made of a material having high thermal conductivity are used, heat insulation property can be enhanced by reducing the number of the spacers 3. As a kind of glass, it is preferable to use an inexpensive soda-lime glass.

<Spacers>

The spacers 3 are used for maintaining the space formed between the first substrate 1 and the second substrate 2. No particular restriction is imposed on the spacers 3 provided that the spacers 3 are made of a material having a low hardness compared to the first substrate 1 and the second substrate 2, and having a proper compressive strength. For example, the spacers 3 may be formed by using glass, metal, an alloy, steel, ceramic, plastic or the like. It is preferable to use a material having low thermal conductivity from a viewpoint of heat insulation property.

Although the shape of the spacer 3 is not particularly limited, for example, a spacer having a circular columnar shape, a spherical shape, a wire shape, or a meshed shape can be used.

The size of the spacer 3 can be selected in conformity with a thickness of the space formed between the first substrate 1 and the second substrate 2. For example, when it is desirable to set a distance between two glass substrates to 200 μm, a spacer having a diameter of approximately 200 μm may be used as the spacer 3. An interval at which spherical, wired, or meshed spacers are arranged is set to 200 mm or below, and preferably to 10 mm to 100 mm inclusive. The spacers 3 may be arranged regularly or irregularly provided that the interval falls within the abovementioned range.

To obtain the space portion in a vacuum state having an appropriate thickness, it is effective to adopt spherical beads or the like having a uniform particle size for forming the spacers 3 and the sealing portion 4.

<Sealing Portion>

The sealing portion 4 is formed using a sealing material containing a low-melting point glass. The sealing material may contain low thermal expansion filler particles, metal particles and the like besides the low-melting point glass. A material which is formed by applying by coating a paste like material formed by mixing these materials and a solvent using a dispenser or the like to a periphery of the first substrate 1 or the second substrate 2 and by provisionally baking the paste like material after drying can be used as a sealing material. On the other hand, a material which is formed by applying by coating such a paste like material on both surfaces of a ribbon-like foil and by provisionally baking the paste like material after drying can be used as a sealing material.

As the low-melting point glass, it is possible to use a lead-free low-melting point glass containing vanadium oxide ($V_2O_5$) and tellurium oxide ($TeO_2$). A glass containing vanadium oxide and tellurium oxide has a low softening point and hence, it is possible to provide hermetic sealing at a low temperature. A lead-based low-melting point glass contains a large amount of lead designated as an inhibited substance described RoHS directive. Accordingly, it is not preferable to apply such a lead-based low-melting point glass to the vacuum heat insulation multi-layered glass panel or the like from a viewpoint of the preservation of an environment.

The lead-free low-melting point glass may preferably further contain silver oxide ($Ag_2O$). A lead-free glass which further contains silver oxide in addition to vanadium oxide and tellurium oxide exhibits a lower softening point. Accordingly, it is possible to provide hermetic sealing at a lower temperature. Lowering of a sealing temperature allows the vacuum heat insulation multi-layered glass panel or the like where rapid heating and rapid cooling are difficult to acquire advantageous effects such as shortening of a manufacturing takt, and an inexpensive manufacture due to the reduction of investment cost for introducing a mass production facility can be realized. Further, lowering of a sealing temperature also has an advantageous effect that a reinforced glass is applicable to the first substrate 1 and the second substrate 2. In this specification, the low-melting point glass means a glass having a softening point of 400° C. or below.

A total amount of $V_2O_3$ and $TeO_2$ in the low-melting point glass is preferably 50 mol % to 80 mol % inclusive. In the case where the low-melting point glass further contains $Ag_2O$, a total amount of $V_2O_3$, $TeO_2$, and $Ag_2O$ is preferably 70 mol % or more, and is more preferably 80 mol % to 98 mol % inclusive.

The content of $V_2O_3$ is preferably 15 mol % to 45 mol % inclusive, the content of $TeO_2$ is preferably 15 mol % to 45 mol % inclusive, and the content of $Ag_2O$ is preferably 10 mol % to 50 mol % inclusive. Further, the content of $TeO_2$ is preferably 1 to 2 times as large as the content of $V_2O_3$ in terms of molar ratio, and the content of $Ag_2O$ is preferably 2 times or less as large as the content of $V_2O_3$ in terms of molar ratio.

The low-melting point glass may contain at least one kind selected from a group of $Li_2O$, $K_2O$, BaO, $WO_3$, $MoO_3$, and $P_2O_5$ at a rate of 30 mol % or less. The low-melting point glass may preferably contain at least one kind selected from a group of $Li_2O$, $K_2O$, BaO, $WO_3$, $MoO_3$, and $P_2O_5$ at a rate of 20 mol % or less. The low-melting point glass may further contain, as additional components, at least one selected from a group of $Fe_2O_3$, $Al_2O_3$, $Ga_2O_3$, $In_2O_3$, $Y_2O_3$, $La_2O_3$, $CeO_2$, $Er_2O_3$, and $Yb_2O_3$. The total content of these additional components is preferably 5 mol % or less, and is more preferably 0.1 mol % to 3 mol % inclusive.

The content of the lead-free low-melting point glass in the sealing material is preferably 40 vol % or more. It is unnecessary for the low-melting point glass to maintain an amorphous state after sealing, and the low-melting point glass may be crystalized.

The low thermal expansion filler may be a filler having a negative thermal expansion coefficient. Since the sealing material contains low thermal expansion filler particles, a thermal expansion difference between the first substrate 1, the sealing portion 4, and the second substrate 2 can be reduced and hence, it is possible to obtain the sealing portion having a higher bonding strength. As a material for forming low thermal expansion filler particles having a negative thermal expansion coefficient, it is possible to use zirconium tungsten phosphate ($Zr_2$ ($WO_4$) ($PO_4)_2$), niobium oxide ($Nb_2O_5$), β-eucryptite ($LiAlSiO_4$), quartz glass ($SiO_2$) or the like. Among these materials for forming the low thermal expansion filler, it is preferable to use zirconium tungsten phosphate ($Zr_2$ ($WO_4$) ($PO_4)_2$). It is because zirconium tungsten phosphate exhibits favorable wettability with the lead-free low-melting point glass containing vanadium oxide and tellurium oxide. From a viewpoint of acquiring both favorable hermetic property and a favorable bonding strength, the content of the low thermal expansion filler particles in the sealing material is preferably 10 vol % to 45 vol % inclusive.

Metal particles are preferably made of low-melting point metal having a melting point of 300° C. or below. As low-melting point metal, tin, or a tin alloy can be used, for example. As a tin alloy, an alloy which contains any one of silver, copper, zinc, and antimony can be preferably used. From a viewpoint of acquiring favorable heat insulation property and a favorable bonding strength, a rate of metal particles in the sealing material is preferably 10 vol % to 70 vol % inclusive.

In the case where a material obtained by applying by coating a paste containing the low-melting point glass to both surfaces of a ribbon-like foil and by performing provisional baking is used as the sealing material, a metal foil can be used as the ribbon-like foil. By using the material which is obtained by applying by coating a paste containing the low-melting point glass to both surfaces of the ribbon-like foil as the sealing material, an amount of the low-melting point glass used as the sealing material can be reduced. As a result, an amount of gas released from the low-melting point glass can be reduced and hence, a degree of vacuum can be enhanced.

As the ribbon-like metal foil, for example, a foil made of an iron-nickel alloy, an iron-nickel-chromium alloy, aluminum metal, an aluminum alloy, and a clad material made of these materials can be used, for example.

<Gas Trapping Material>

Figure 3:
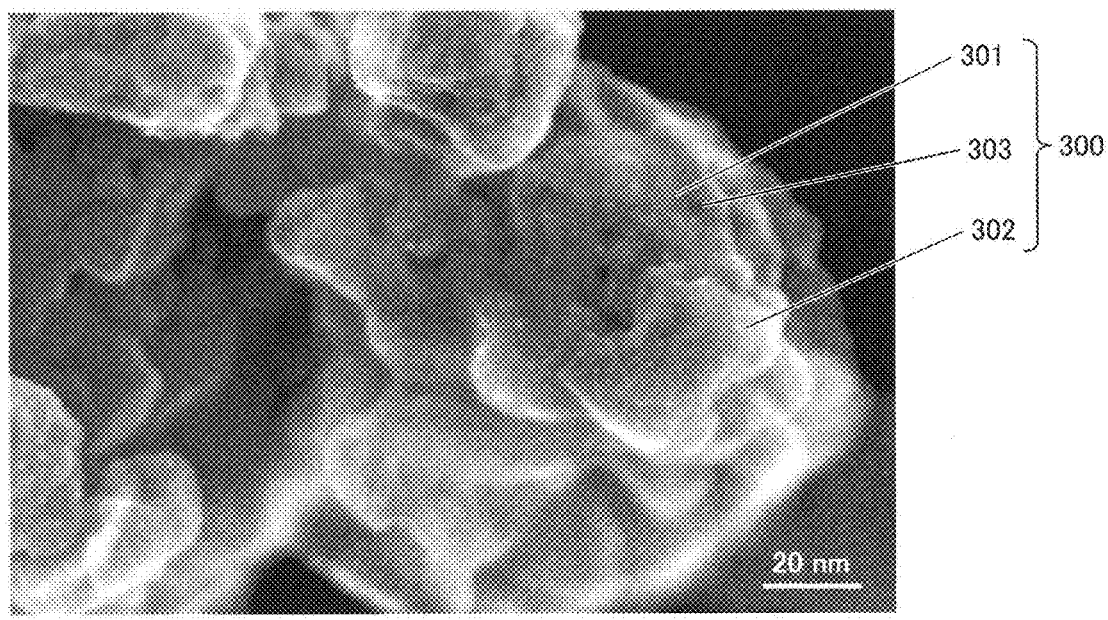
FIG. 3 is a SEM observation photograph of a gas trapping material according to the embodiment of the present invention.

FIG. 3 is a SEM observation photograph of the gas trapping material according to the embodiment of the present invention. In this embodiment, also in a glass panel sealing step where a gas is released from the sealing material and the substrates, the gas trapping material 300 maintains its gas trapping characteristic even after glass panel sealing, can activate at a low temperature of 300° C. or below, and has the thin film-like structure which enables easy mounting of the gas trapping material 300 to the substrate.

As shown in FIG. 3, the gas trapping material 300 contains porous metal oxide 301 having a large number of pores 303, and silver particles 302 carried by the porous metal oxide 301. It is sufficient that the porous metal oxide 301 is porous. To be more specific, as the gas trapping material 300, it is possible to use $Al_2O_3$, $SiO_2$, $TiO_2$, $ZrO_2$, $SnO_2$, CoO, CuO, $Y_2O_3$, ZnO, $WO_3$, $MoO_2$, $V_2O_5$, $Ta_2O_5$, $Nb_2O_5$, $MnO_2$, $Fe_2O_3$, NiO, $GeO_2$, $TeO_2$, $Bi_2O_3$, $La_2O_3$, zeolite, and the like. Among these materials, it is particularly preferable to use cerium oxide ($CeO_2$).

In the gas trapping material, the silver particles 302 have a gas trapping capacity. Since the silver particles 302 are carried by the porous metal oxide 301, a specific surface area of the silver particles 302 is increased. Accordingly, a gas trapping characteristic of the silver particles 302 can be enhanced.

The reason is considered as follows. The silver particles 302 are brought into contact with the porous metal oxide 301 and hence, an electron state of the porous metal oxide 301 influences an electron state of the silver particles 302 whereby the silver particles 302 are brought into a state where the silver particles 302 can trap various kinds of gases. Accordingly, the gas trapping characteristic of the silver particles 302 can be enhanced.

Surfaces of the silver particles 302 are brought into an oxidation state due to a release of a gas from constitutional members when sealing is performed and baking under an air atmosphere. However, the silver particles 302 are heated at a temperature of approximately 200° C. or above and hence, the silver particles 302 are thermally reduced whereby an oxide layer on the surface of each silver particle 302 is removed. Accordingly, the silver particles 302 can maintain a gas trapping characteristic even after sealing. In this manner, the silver particles 302 have heat reduction property and hence, the silver particles 302 are particularly suitable as a material having a gas trapping characteristic which is carried by the porous metal oxide 301. Materials other than the abovementioned materials can also acquire substantially the same advantageous effect provided that these materials have substantially the same specific surface area and substantially the same electron state. It is estimated that, by forming the silver particles as fine particles of nano-order, surfaces of the silver particles are negatively charged, and various gaseous molecules are adsorbed by the negative charge.

Although the shape of the gas trapping material is not particularly limited, the gas trapping material is preferably formed in a powder state or in a thin film state in view of easiness of mounting the gas trapping material. In the case where the gas trapping material is formed of a thin film, the shape of the gas trapping material is not particularly limited. A disk shape, a strip shape and the like are named as the shape of the gas trapping material, for example. Sizes including the thickness of the gas trapping material are not particularly limited provided that the gas trapping material can be accommodated in the gap portion formed by the pair of oppositely facing substrates. However, although it is not particularly limited, when the vacuum heat insulation multi-layered glass panel is used as a window glass, the gas trapping material may preferably have sizes with which the gas trapping material is concealed by a sash. In this case, it is necessary to install the gas trapping material capable of sufficiently trapping gases released from various members used for forming the vacuum heat insulation multi-layered glass panel.

With respect to content ratios of the porous metal oxide 301 and the silver particles 302 contained in the gas trapping material 300, it is preferable that the content ratio of the porous metal oxide 301 be higher than the content ratio of the silver particles 302 since a gas trapping characteristic can be effectively enhanced when a specific surface area of the silver particles 302 is large. On the other hand, when the content ratio of the porous metal oxide 301 is excessively large, there is a concern that a rate of the silver particles 302 is decreased and hence, a desired gas trapping characteristic cannot be obtained. Further, when the content ratio of the porous metal oxide 301 is excessively low, the silver particles 302 become coarse and hence, a specific surface area of the silver particles 302 is decreased whereby there is a concern that a desired gas trapping characteristic cannot be obtained. Accordingly, the content ratio of the silver particles 302 is preferably 1 mass % to 70 mass % inclusive, and is more preferably 5 mass % to 50 mass % inclusive with respect to a total weight of the porous metal oxide 301 and the silver particles 302.

In the present invention, a particle size of the porous metal oxide 301 is preferably 5 nm to 200 μm inclusive, and is more preferably 10 nm to 100 μm inclusive. When the particle size is smaller than 5 nm, the number of pores in the particle is decreased and hence, a specific surface area of the silver particles 302 contained in the porous metal oxide 301 is decreased whereby there is a concern that a desired gas trapping characteristic cannot be obtained. On the other hand, when the particle size is larger than 200 μm, the number of pores becomes excessively large and hence, the silver particles 302 are embedded in the porous metal oxide 301 whereby there is a concern that the silver particles 302 do not appear on a surface of the porous metal oxide 301 and a desired gas trapping characteristic cannot be obtained.

A particle size of the silver particle 302 is preferably 0.5 nm to 100 nm inclusive, and is more preferably 1 nm to 50 nm inclusive. In the case where the particle size is smaller than 0.5 nm, there is a concern that a desired gas trapping characteristic cannot be obtained due to an effect of an electron state of the porous metal oxide 301 contained in the gas trapping material. On the other hand, if the particle size is larger than 100 nm, a specific surface area of the silver particles 302 is small and hence, there is a concern that a desired gas trapping characteristic cannot be obtained.

A particle size of the porous metal oxide 301 and a particle size of the silver particles 302 can be measured by a plane image obtained when the gas trapping material 300 is observed by an observation unit such as an electron microscope. Further, the particle size may be a value obtained by averaging particle sizes of a predetermined number of porous metal oxides 301 or a predetermined number of silver particles 302 displayed on an observation photograph of a predetermined magnification (average particle size).

A specific surface area of the porous metal oxide 301 contained in the gas trapping material relates to a reaction speed and a capacity of gas adsorption. Accordingly, the specific surface area of the porous metal oxide 301 is preferably 30 $m^2/g$ or more, is more preferably 100 $m^2/g$ or more, and is still more preferably 200 $m^2/g$ or more. The pores 303 accelerate the diffusion of gases into the pores 303 and lowers effective thermal conductivity of the gas trapping material 300. Accordingly, a volume of the pores 303 is preferably 0.01 $cm^3/g$ or more and is more preferably 0.05 $cm^3/g$ or more. A specific surface area of the porous metal oxide 301 can be measured by an analyzer using a gas adsorption method.

A method of preparing the gas trapping material 300 having the abovementioned configuration is not particularly limited. For example, a solid phase method (mixing method or the like), an impregnation method, and a liquid phase method (a sol-gel method, a coprecipitation method or the like) can be used. As described previously, in the gas trapping material 300, the silver particles 302 have a function of trapping gases and hence, it is preferable that the silver particles 302 are carried and exposed on a surface of the porous metal oxide 301.

In the case where a mixing method is used, for example, a raw material of the silver particles 302 is mixed into a raw material of the porous metal oxide 301, and these materials are blended by wet blending and, thereafter, are dried and baked and hence, the gas trapping material 300 can be obtained.

In this embodiment, the gas trapping material 300 is provided for the purpose of trapping mainly $O_2$, $CO_2$ and moisture. However, for example, in the case where the gas trapping material 300 traps a released gas such as $CO$, $N_2$, $H_2$, $NO$, or $NO_2$, a gas trapping material which conforms with the released gas can be suitably disposed in the gap portion 5 of the vacuum heat insulation equipment together with the gas trapping material according to the present invention. As a gas trapping material which can be disposed together with the gas trapping material 300 according to the present invention, for example, an alloy containing Zr (zirconium), V (vanadium), Fe (iron) and the like, Ag (silver), Li (lithium), Mg (magnesium), Na (sodium), K (potassium), Ti (titanium), zeolite, $Na_2TiO_3$, $Li_2TiO_3$, $Na_2ZrO_3$, $Li_2ZrO_3$, $CeO_2$ and the like can be named. The number of kinds of these gas trapping materials to be disposed in the gap portion 5 is not limited, and two or more gas trapping materials can be disposed in combination in the gap portion 5.

The gas trapping material 300 may be formed in a state where the gas trapping material 300 is stacked on the base material for maintaining its structure or for facilitating installation of the gas trapping material 300 in the gap portion 5. Although a material for forming the base material is not particularly limited, a material which is not melted at 300° C. or below which is a sealing temperature is preferably used. For example, Al (aluminum), Cu (copper), Au (gold), Ag (silver), Zn (zinc), Ti (titanium), Fe (iron), Co (cobalt), Ni (nickel) and the like can be named.

The gas trapping material 300 requires treatment for activating the gas trapping material 300 before the vacuum heat insulation equipment is used. Heat treatment is named as a method of activating the gas trapping material 300. A heat treatment temperature is not particularly limited provided that the heat treatment temperature is a temperature at which silver is thermally reduced or above. A clean metal surface is exposed due to heat reduction of the silver particles and hence, the silver particles can exhibit gas trapping characteristics for various kinds of gas components. An atmosphere during activation of the gas trapping material 300 is performed is not particularly limited. The gas trapping material 300 may be activated in an air atmosphere, an inert atmosphere, a reducing atmosphere, a reduced pressure atmosphere or the like. By activating the gas trapping material 300 simultaneously with heat treatment at the time of sealing the vacuum heat insulation multi-layered glass panel 100, manufacturing efficiency of the vacuum heat insulation multi-layered glass panels can be enhanced.

The structure and the composition of the gas trapping material 300 can be confirmed by an Auger electron spectroscopy, an X-ray photoelectron spectroscopy, a fluorescent X-ray analysis, an X-ray diffraction analysis, electron microscope observation or the like.

The following is known. A surface of the gas trapping material is usually covered by oxide, nitride or the like in an atmosphere. Accordingly, the gas trapping material 300 does not exhibit a gas trapping characteristic at a room temperature. However, when the gas trapping material is heated, oxide, nitride or the like formed on the surface of the gas trapping material is decomposed. As a result, a clean surface which is not exposed to an atmosphere is exposed on a surface of the gas trapping material. Accordingly, gaseous molecules in a vacuum are adsorbed in the surface and hence, the gas trapping material can exhibit a gas trapping characteristic. On the other hand, when a gas trapping material is activated simultaneously with the glass panel sealing step as described previously from a viewpoint of enhancing a manufacturing takt of a glass panel, the gas trapping material traps gas components released from a glass paste and a glass plate used as a sealing material during heating. Or the gas trapping material traps a gas component in an atmosphere when the gas trapping material passes through the atmospheric baking step. Accordingly, there exists a drawback that the gas trapping material cannot exhibit a gas trapping characteristic at the time of performing vacuum sealing.

The gas trapping material according to the present invention can, even in a glass panel sealing step where gases are released from the sealing material and the glass plates, maintain gas trapping characteristics of the gases after the glass panel sealing and, further, the gas trapping material can be activated at a low temperature of 300° C. or below. Further, the gas trapping material has a thin film shaped structure so that the gas trapping material can be installed on the glass plate easily.

<Method of Manufacturing Vacuum Heat Insulation Multi-Layered Glass Panel>

Next, the description is made with respect to a method of manufacturing vacuum heat insulation equipment to which the present invention is applied. In the description made hereinafter, an example is described where vacuum sealing of a glass substrate is performed by a so-called "exhaust pipe method".

Figure 4A:
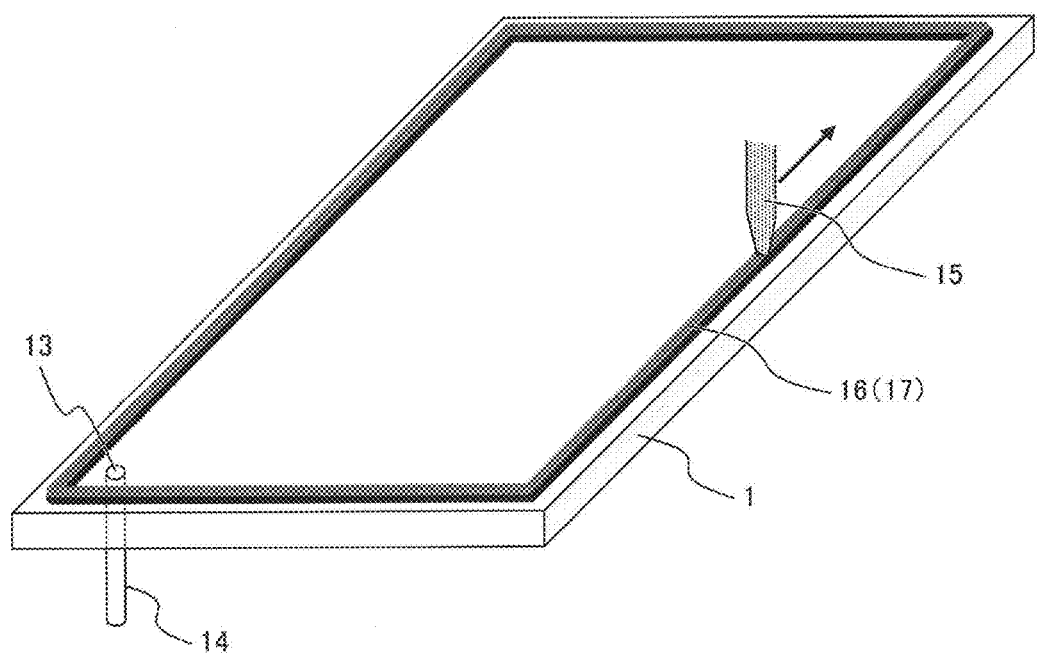
FIG. 4A is a schematic perspective view showing the configuration of a vacuum heat insulation multi-layered glass panel to which the present invention is applied during a manufacturing step.
Figure 4B:
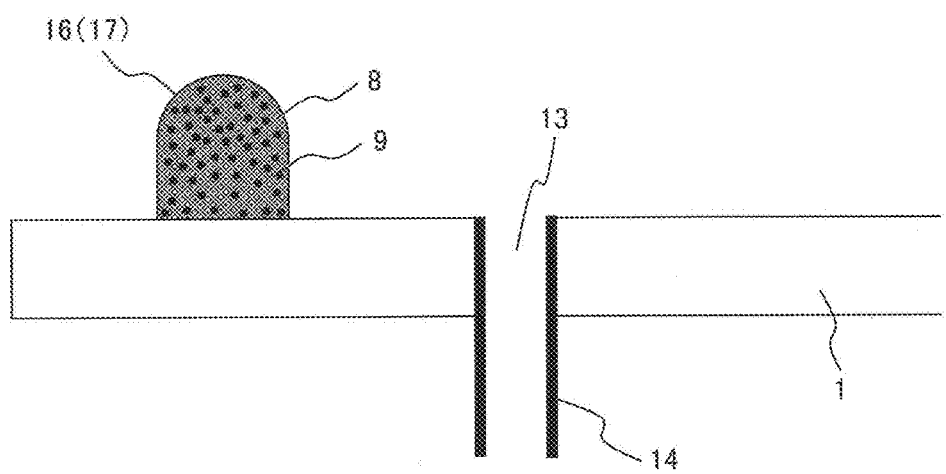
FIG. 4B is an enlarged cross-sectional view of a peripheral portion of the vacuum heat insulation multi-layered glass panel shown in FIG. 4A.

FIG. 4A is a schematic perspective view showing the configuration of the vacuum heat insulation multi-layered glass panel to which the present invention is applied during a manufacturing step. FIG. 4B is an enlarged cross-sectional view of a peripheral portion of the vacuum heat insulation multi-layered glass panel shown in FIG. 4A. Firstly, as shown in FIG. 4A, a sealing material paste 16 is applied using a dispenser 15 by coating to a peripheral portion of the first glass substrate 1 in which an exhaust hole 13 and an exhaust pipe 14 are formed. Then, the sealing material paste 16 is dried on a hot plate for minutes at a temperature of approximately 150° C., and a solvent of the sealing material paste 16 is removed by evaporation.

Figure 9A:
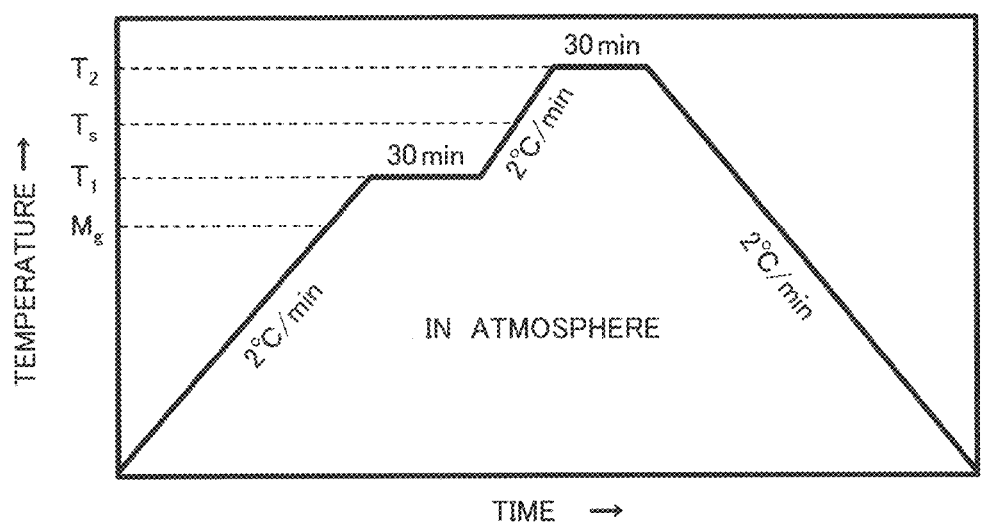
FIG. 9A is a graph showing a temperature profile of heat treatment in a step of removing a binder resin of a sealing material paste.

FIG. 9A is a graph showing a temperature profile of heat treatment in a step of removing a binder resin of a sealing material paste. After the step shown in FIG. 4A, a binder resin in the sealing material paste is decomposed and removed in accordance with the temperature profile shown in FIG. 9A. Then, particles of the low-melting point glass 8 contained in the sealing material paste 16 are softened and fluidized by baking thus forming a sealing material 17 on the first glass substrate 1.

As shown in FIG. 9A, a baking condition of the low-melting point glass 8 is set such that a temperature elevating speed and a temperature lowering speed are respectively set to 2° C./min in an atmosphere. In a temperature elevating step, a baking temperature of the low-melting point glass 8 is temporarily held at a fixed temperature $T_1$ between a yield point $M_g$ and a softening point $T_s$ of the low-melting point glass 8 for approximately 30 minutes thus decomposing and removing the binder resin. Then, the baking temperature of the low-melting point glass 8 is elevated again, and is held at a fixed temperature $T_2$ which is higher than the softening point $T_s$ by approximately 20 to 40° C. for approximately 30 minutes thus forming the sealing material 17 on the peripheral portion of the first glass substrate 1.

Figure 10:
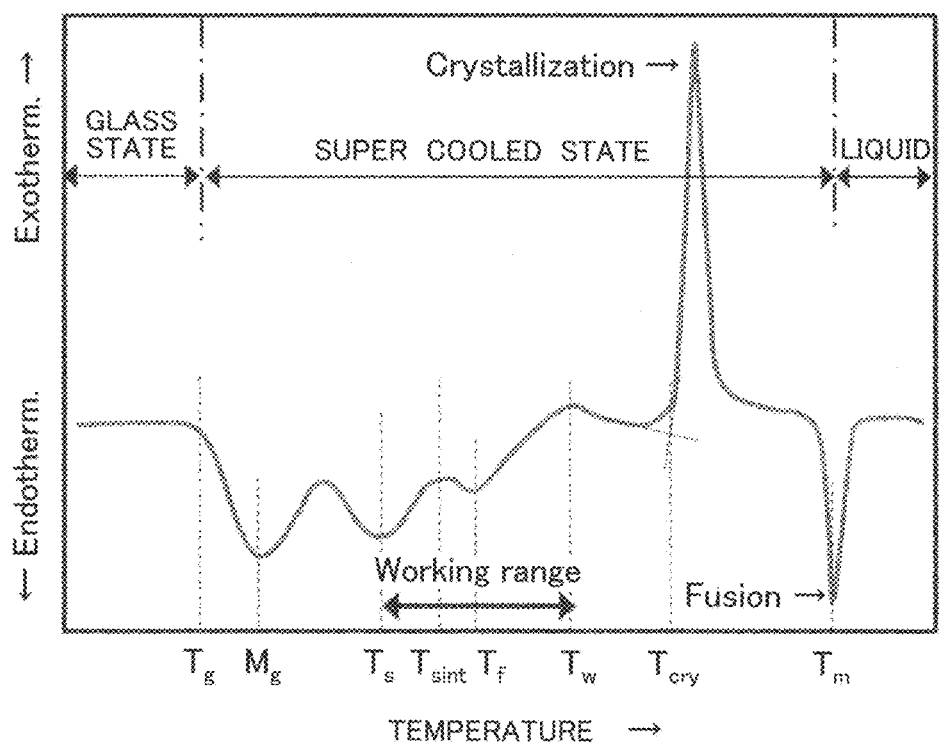
FIG. 10 is a graph showing a differential thermal analysis (DTA) curve of a general glass composition.

A characteristic temperature of the low-melting point glass is described hereinafter. FIG. 10 is a DTA curve of general glass composition. In general, a DTA (Differential Thermal Analysis) of glass is performed such that the DTA curve is measured at an elevating temperature speed of 5° C./min in an atmosphere by using glass particles having a particle size of approximately several tens μm and by using alumina ($\alpha$-$Al_2O_3$) particles of high purity as a standard specimen. As shown in FIG. 10, a start temperature of a first heat adsorption peak or a temperature at which glass is changed to a supercooled liquid is referred to as a transition point $T_g$, a point at which the heat adsorption peak temperature or expansion of glass stops is referred to as a yield point $M_g$, a second heat adsorption peak temperature or a temperature at which glass is started to be softened is referred to as a softening point $T_s$, a temperature at which glass is changed to a sintered body is referred to as a sintering point $T_{sint}$, a temperature at which the glass melts is referred to as a fluidity point $T_f$, a temperature suitable for molding molten glass is referred to as a working point $T_w$, and a start temperature of a heat generation peak by crystallization is referred to as a crystallization start temperature $T_{cry}$. The respective characteristic temperatures are obtained by a tangent method.

The respective characteristic temperatures of $T_g$, $M_g$, $T_s$ and the like are defined by viscosity of the glass. $T_g$ is a temperature which corresponds to $10^{13.3}$ poise, $M_g$ is a temperature which corresponds to $10^{11.0}$ poise, $T_s$ is a temperature which corresponds to $10^{7.65}$ poise, $T_{sint}$ is a temperature which corresponds to $10^6$ poise, $T_f$ is a temperature which corresponds to $10^5$ poise, and $T_w$ is a temperature which corresponds to $10^4$ poise.

Through the abovementioned steps, the sealing material paste 16 changes to the sealing material 17.

Figure 5A:
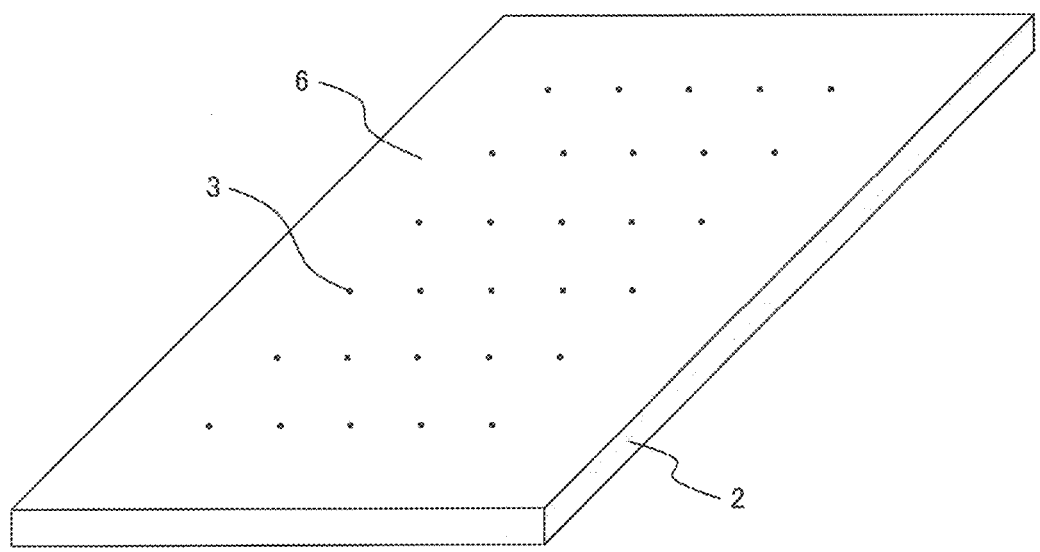
FIG. 5A is a schematic perspective view showing the configuration of a vacuum heat insulation multi-layered glass panel to which the present invention is applied during a manufacturing step.
Figure 5B:
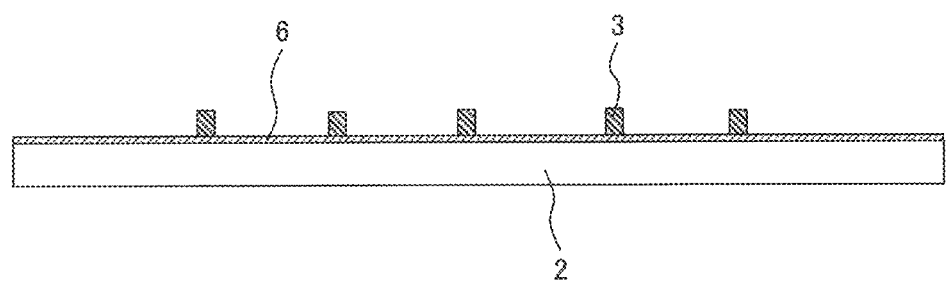
FIG. 5B is a cross-sectional view of the vacuum heat insulation multi-layered glass panel shown in FIG. 5A.

FIG. 5A is a schematic perspective view showing the configuration of the vacuum heat insulation multi-layered glass panel to which the present invention is applied during a manufacturing step, and FIG. 5B is a cross-sectional view of the vacuum heat insulation multi-layered glass panel shown in FIG. 5A. As shown in FIG. 5A and FIG. 5B, the heat reflecting film 6 is formed on the entirety of one surface of the second glass substrate 2 by a vapor deposition method. A large number of spacers 3 are disposed on a surface of the heat reflecting film 6.

Figure 6A:
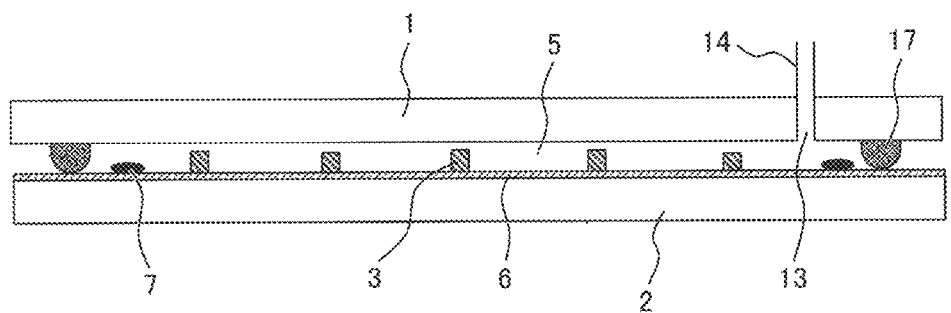
FIG. 6A is a schematic cross-sectional view showing the configuration of a vacuum heat insulation multi-layered glass panel to which the present invention is applied during a manufacturing step.
Figure 6B:
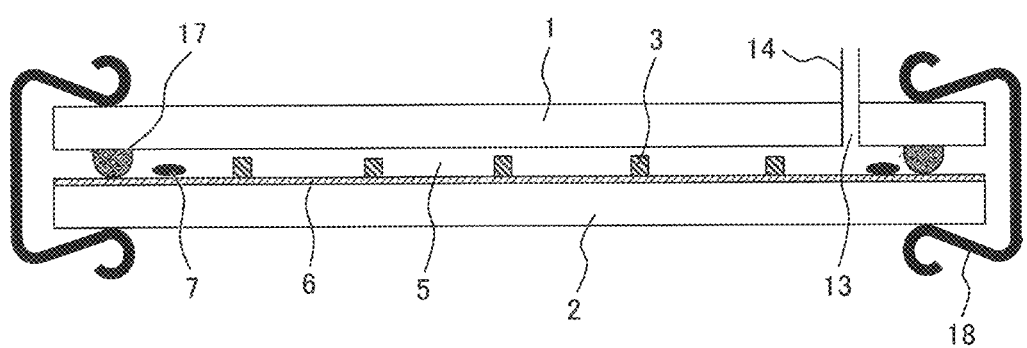
FIG. 6B is a cross-sectional view of the vacuum heat insulation multi-layered glass panel in a step succeeding to the step shown in FIG. 6A.

FIG. 6A is a schematic cross-sectional view showing the configuration of the vacuum heat insulation multi-layered glass panel to which the present invention is applied during a manufacturing step. FIG. 6B is a cross-sectional view of the vacuum heat insulation multi-layered glass panel in a step succeeding to the step shown in FIG. 6A. As shown in FIG. 6A, the first glass substrate 1 and the second glass substrate 2 prepared in the abovementioned steps are aligned with each other such that the first glass substrate 1 and the second glass substrate 2 opposedly face each other. Then, as shown in FIG. 6B, the aligned structure is fixed by heat resistant clips 18 or the like. The aligned and fixed structure is disposed in a vacuum evacuation furnace 19 as shown in FIG. 7A, an electric heater 20 is mounted on the exhaust pipe 14, and the exhaust pipe 14 is connected to a vacuum pump 21.

Figure 7A:
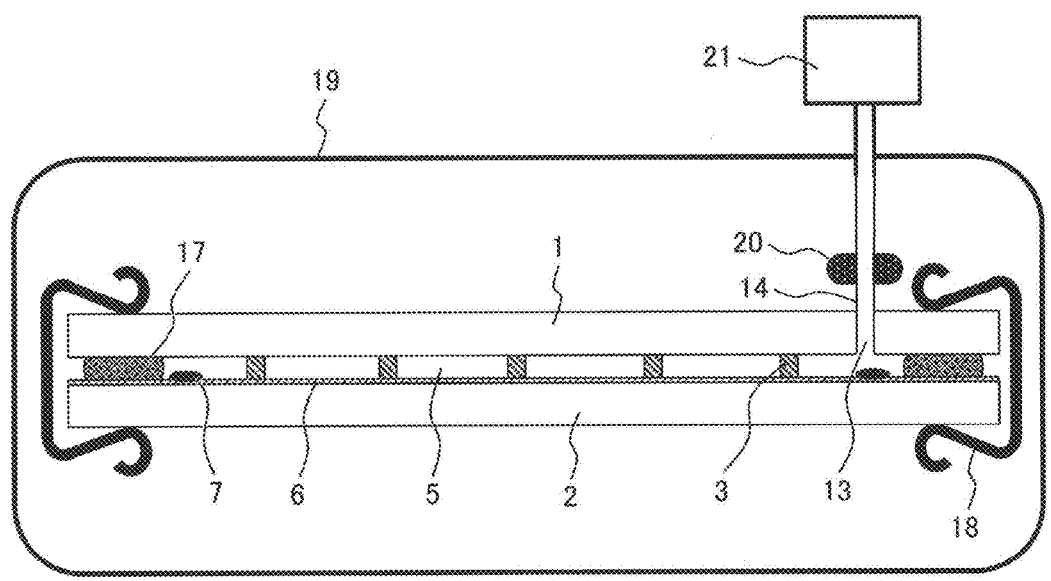
FIG. 7A is a cross-sectional view of the vacuum heat insulation multi-layered glass panel in a step succeeding to the step shown in FIG. 6B.
Figure 7B:
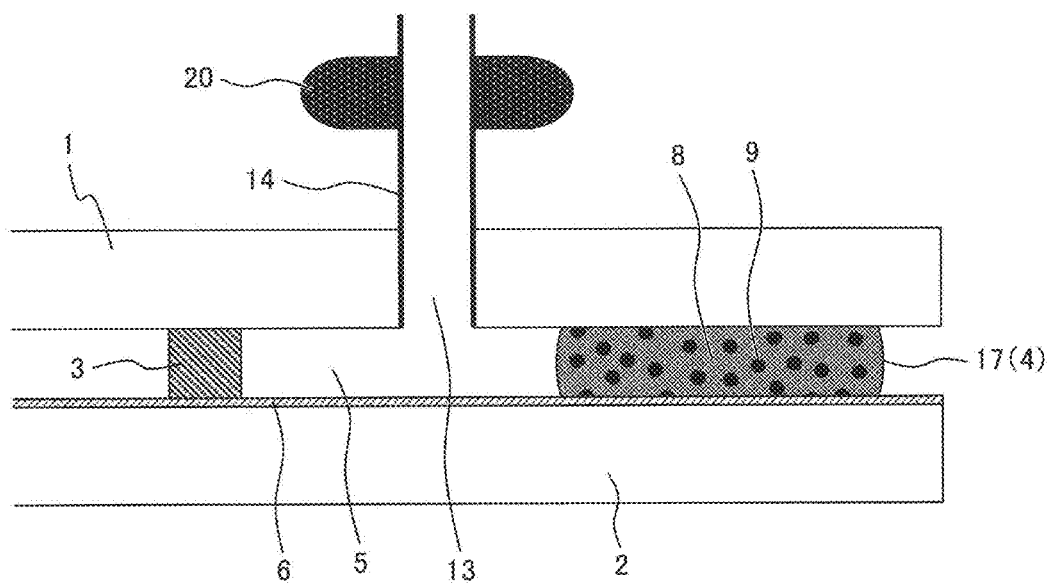
FIG. 7B is an enlarged cross-sectional view of a sealing portion and a periphery of the sealing portion of the vacuum heat insulation multi-layered glass panel shown in FIG. 7A.
Figure 9B:
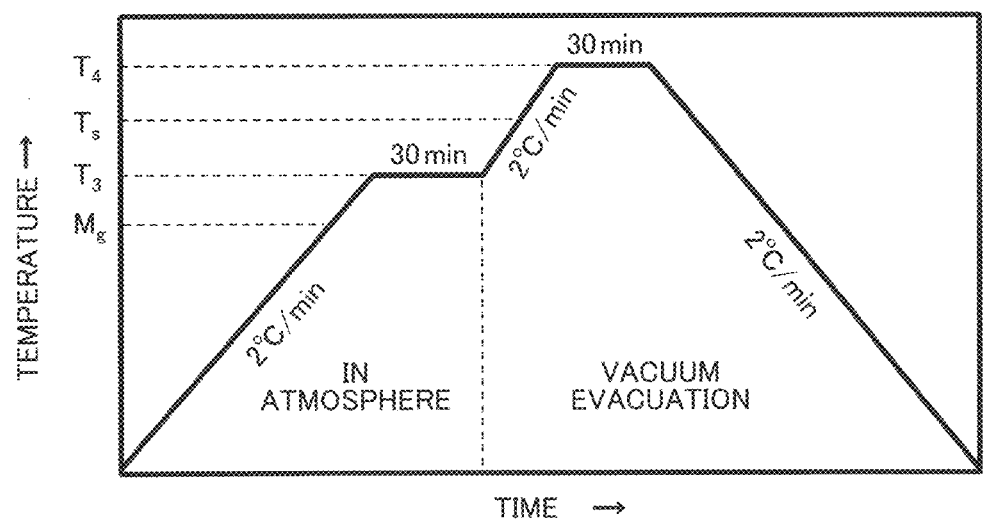
FIG. 9B is a graph showing a temperature profile at the time of heating a sealing portion in a step of reducing a pressure in an inner space of a vacuum heat insulation multi-layered glass panel.

FIG. 7A is a cross-sectional view of the vacuum heat insulation multi-layered glass panel in a step succeeding to the step shown in FIG. 6B, and FIG. 7B is an enlarged cross-sectional view of the sealing portion and a periphery of the sealing portion of the vacuum heat insulation multi-layered glass panel shown in FIG. 7A. FIG. 9B is a graph showing a temperature profile at the time of heating the sealing portion in a step of reducing a pressure in an inner space of the vacuum heat insulation multi-layered glass panel. As shown in FIG. 9B, firstly, the sealing portion is heated to a fixed temperature $T_3$ between the yield point $M_g$ and the softening point $T_s$ of the low-melting point glass 8 contained in the sealing material 17 at an atmospheric pressure, and heating is maintained for approximately 30 minutes. Then, while evacuating the gap portion 5 through the exhaust hole 13 and the exhaust pipe 14 shown in FIG. 7A and FIG. 7B, the sealing portion is heated to the temperature T4 which is higher than the softening point $T_s$ by approximately 10 to 30° C. Due to such an operation, the sealing portion 4 is formed on the peripheral portion of the vacuum heat insulation multi-layered glass panel by the sealing material 17, and the gap portion 5 is brought into a vacuum state.

Figure 8A:
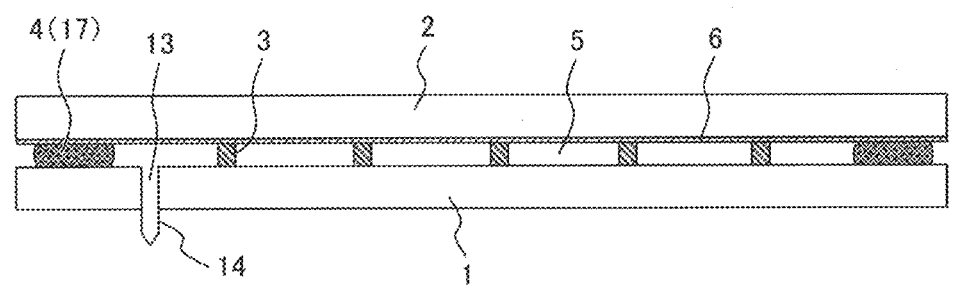
FIG. 8A is a cross-sectional view of the vacuum heat insulation multi-layered glass panel in a step succeeding to the step shown in FIG. 7A.
Figure 8B:
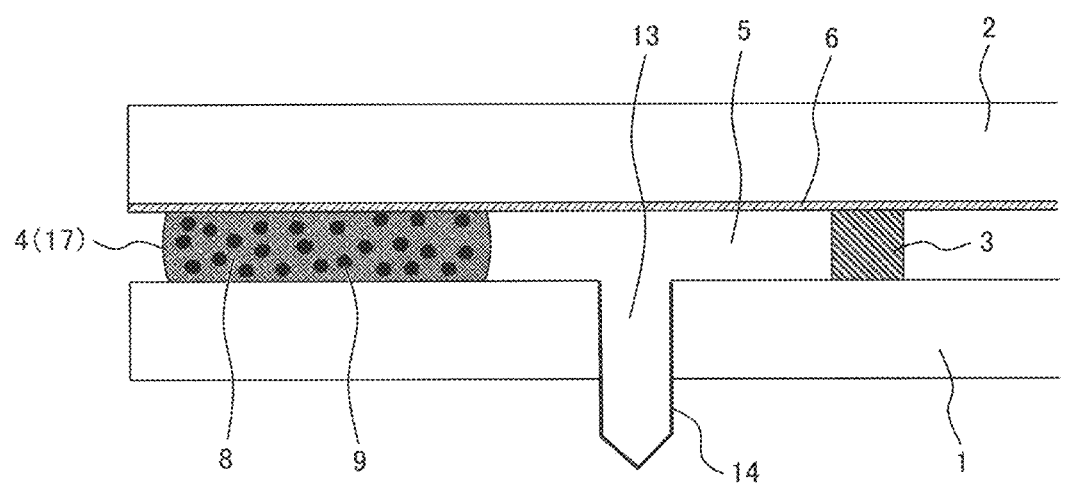
FIG. 8B is an enlarged cross-sectional view of a sealing portion and a periphery of the sealing portion of the vacuum heat insulation multi-layered glass panel shown in FIG. 8A.

FIG. 8A is a cross-sectional view of the vacuum heat insulation multi-layered glass panel in a step succeeding to the step shown in FIG. 7A, and FIG. 8B is an enlarged cross-sectional view of the sealing portion and a periphery of the sealing portion of the vacuum heat insulation multi-layered glass panel shown in FIG. 8A. As shown in FIG. 8A and FIG. 8B, by burning off the exhaust pipe 14 using the electric heater at the time of cooling or after cooling, a vacuum state of the gap portion 5 can be maintained.

The vacuum heat insulation multi-layered glass panel is manufactured in accordance with the abovementioned steps.

EXAMPLES

Next, specific examples of the present invention are described. However, the technical scope of the present invention is not limited to these examples. Vacuum heat insulation multi-layered glass panels each provided with a gas trapping material according to examples 1 to 13 and comparison examples 1 to 3 are prepared, and a degree of vacuum (temperature change ΔT) in each vacuum heat insulation multi-layered glass panel is evaluated.

Example 1

<Gas Trapping Material>

Silver nitrate powder and cerium oxide powder are weighed such that the content of silver particles becomes 5 mass %. These materials are dispersed in pure water and, thereafter, a mixture of these materials is agitated by an evaporator. Then, the mixture is dried at a temperature of 80° C. under a reduced pressure thus obtaining mixed powder. Then, approximately 0.6 g of the mixed powder is filled in a quartz boat, and the mixed powder is held in an air atmosphere at a temperature of 400° C. for two hours thus manufacturing a gas trapping material. The gas trapping material is disposed in a glass panel for evaluation of a gas trapping characteristic, and the gas trapping characteristic is evaluated.

<Vacuum Heat Insulation Multi-Layered Glass Panel Including Gas Trapping Material>

A multi-layered glass is prepared by using two rectangular parallelepiped soda-lime glasses as a first substrate, and a second substrate respectively. The sealing material is applied by coating to the first substrate such that an outer periphery of the sealing material is formed in a square shape of 90 mm×90 mm using a dispenser. The sealing material is prepared by mixing glass, a filler material, and glass beads at a volume rate of 56:14:30. Low-melting point glass is used as the glass. With respect to characteristic temperature of the low-melting point glass, a transition point $T_g$ is 203° C., the yield point $M_g$ is 221° C., the softening point $T_s$ is 258° C., the sintering point $T_{sint}$ is 267° C., a fluidity point $T_f$ is 282° C., a working point $T_w$ is 288° C., and a crystallization start temperature $T_{cry}$ is 349° C. After the sealing material is applied by coating and is dried, the gas trapping material is applied by coating in a state where ethanol is mixed to the gas trapping material inside the sealing material, and is dried.

Then, metal spacers (φ200 μm) are disposed uniformly inside the sealing material and, thereafter, the second substrate is placed on the first substrate thus forming the oppositely facing structure. Then, four sides of the first substrate and the second substrate are fixed using clips. The oppositely facing structure is disposed in the vacuum evacuation furnace 19, the electric heater 20 is mounted on the exhaust pipe of the second substrate, and the exhaust pipe is connected to the vacuum pump. Then, in accordance with the sealing temperature profile shown in FIG. 9B, firstly, the oppositely facing structure is heated to the previously-mentioned fixed temperature $T_3$ between the yield point $M_g$ and the softening point $T_s$ of the low-melting point glass at an atmospheric pressure, and the heating is held for approximately 30 minutes. Then, while evacuating the gap portion through the exhaust pipe, the oppositely facing structure is heated to the temperature $T_4$ which is higher than the softening point $T_s$ by 30° C. After cooling the oppositely facing structure, the exhaust pipe is burned off by the electric heater thus manufacturing the vacuum heat insulation multi-layered glass panel.

<Evaluation of Gas Trapping Characteristic of Gas Trapping Material>

A gas trapping characteristic in the vacuum heat insulation multi-layered glass panel is evaluated by measuring a heat insulation performance by the following method. A circular columnar heater which is heated to and held at 60° C. is brought into contact with a center portion of a surface of the second substrate, and a thermometer is brought into contact with a center portion of a surface of the first substrate on an opposite side. A temperature change during 10 minutes is measured by the thermometer. It is determined that the smaller the temperature elevation becomes, the higher heat insulation property of an inner space becomes. That is, it is determined that the smaller the temperature elevation is, the higher the gas trapping characteristic becomes.

Example 2

A vacuum heat insulation multi-layered glass panel is prepared in accordance with substantially the same steps as the example 1 except that the content of silver particles is set to 10 mass %, and the gas trapping characteristic evaluation is performed.

Example 3

A vacuum heat insulation multi-layered glass panel is prepared in accordance with substantially the same steps as the example 1 except that the content of silver particles is set to 20 mass %, and the gas trapping characteristic evaluation is performed.

Example 4

A vacuum heat insulation multi-layered glass panel is prepared in accordance with substantially the same steps as the example 1 except that the content of silver particles is set to 30 mass %, and the gas trapping characteristic evaluation is performed.

Example 5

A vacuum heat insulation multi-layered glass panel is prepared in accordance with substantially the same steps as the example 1 except that the content of silver particles is set to 40 mass %, and the gas trapping characteristic evaluation is performed.

Example 6

A vacuum heat insulation multi-layered glass panel is prepared in accordance with substantially the same steps as the example 1 except that the content of silver particles is set to 50 mass %, and the gas trapping characteristic evaluation is performed.

Example 7

A vacuum heat insulation multi-layered glass panel is prepared in accordance with substantially the same steps as the example 1 except that the content of silver particles is set to 60 mass %, and the gas trapping characteristic evaluation is performed.

Example 8

A vacuum heat insulation multi-layered glass panel is prepared in accordance with substantially the same steps as the example 1 except that the content of silver particles is set to 70 mass %, and the gas trapping characteristic evaluation is performed.

Example 9

A vacuum heat insulation multi-layered glass panel is prepared in accordance with substantially the same steps as the example 1 except that cerium oxide is changed to aluminum oxide ($Al_2O_3$) as porous metal oxide, and the gas trapping characteristic evaluation is performed.

Example 10

A vacuum heat insulation multi-layered glass panel is prepared in accordance with substantially the same steps as the example 1 except that cerium oxide is changed to silicon oxide ($SiO_2$) as porous metal oxide, and the gas trapping characteristic evaluation is performed.

Example 11

A vacuum heat insulation multi-layered glass panel is prepared in accordance with substantially the same steps as the example 1 except that cerium oxide is changed to titanium oxide ($TiO_2$) as porous metal oxide, and the gas trapping characteristic evaluation is performed.

Example 12

A vacuum heat insulation multi-layered glass panel is prepared in accordance with substantially the same steps as the example 1 except that cerium oxide is changed to zirconium oxide ($ZrO_2$) as porous metal oxide, and the gas trapping characteristic evaluation is performed.

Example 13

A vacuum heat insulation multi-layered glass panel is prepared in accordance with substantially the same steps as the example 1 except that cerium oxide is changed to yttrium oxide ($Y_2O_3$) as porous metal oxide, and the gas trapping characteristic evaluation is performed.

Comparison Example 1

A vacuum heat insulation multi-layered glass panel is prepared in accordance with substantially the same steps as the example 1 except that the gas trapping material is made of a Zr alloy, and the gas trapping characteristic evaluation is performed.

Comparison Example 2

A vacuum heat insulation multi-layered glass panel is prepared in accordance with substantially the same steps as the example 1 except that cerium oxide is not added, and the gas trapping characteristic evaluation is performed.

Comparison Example 3

A vacuum heat insulation multi-layered glass panel is prepared in accordance with substantially the same steps as the example 1 except that the gas trapping material is not disposed, and the gas trapping characteristic evaluation is performed.

Figure 11:
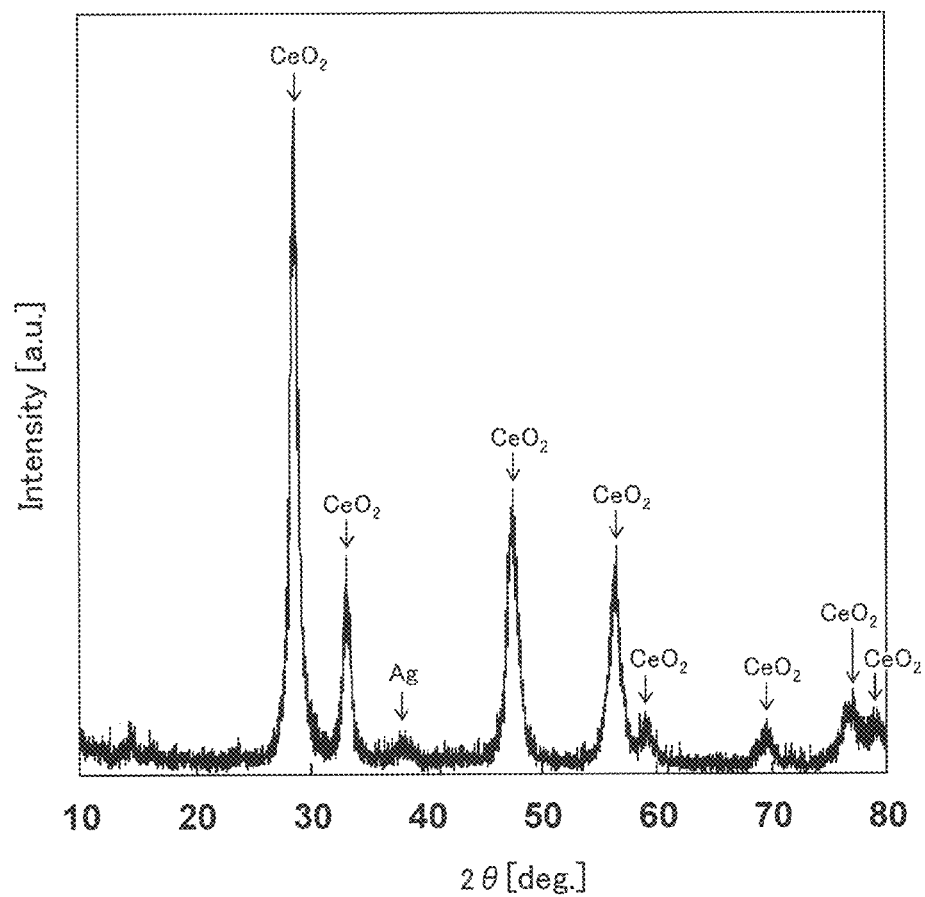
FIG. 11 is a graph showing an X-ray diffraction (XRD) pattern of a gas trapping material according to an example 1.

FIG. 11 is a graph showing an XRD pattern of the gas trapping material according to the example 1. Measuring conditions of X-ray diffraction measurement are set such that measurement range: $2\theta=10$ to $80°$, measurement width: $0.02°$, tube voltage: 48 kV, tube current: 25 mA. From FIG. 11, a peak attributed to cerium oxide is confirmed in the vicinity of $2\theta=28.5, 33.1, 47.8, 56.5, 59.1, 69.4, 76.7$, and $79.0°$, a broad peak attributed to metal silver is confirmed in the vicinity of $2\theta=38.2°$. Based on such an XRD pattern, it is proved that the gas trapping material contained cerium oxide and metal silver.

Table 1 shows the configurations of the gas trapping materials of the examples 1 to 13 and the comparison examples 1 to 3, and a result of the gas trapping characteristic evaluation.

TABLE 1

| | Configuration of gas trapping material | | | | |
|---|---|---|---|---|---|
| | Porous metal oxide | Porous metal oxide specific surface area ($m^2/g$) | Ag content (mass %) | Ag average particle size (nm) | Temperature change $\Delta T$ (° C.) |
| Example 1 | $CeO_2$ | 120 | 5 | 2 | 10 |
| Example 2 | $CeO_2$ | 120 | 10 | 5 | 10 |
| Example 3 | $CeO_2$ | 120 | 20 | 6 | 11 |
| Example 4 | $CeO_2$ | 120 | 30 | 7 | 12 |
| Example 5 | $CeO_2$ | 120 | 40 | 9 | 12 |
| Example 6 | $CeO_2$ | 120 | 50 | 10 | 12 |
| Example 7 | $CeO_2$ | 120 | 60 | 11 | 12 |
| Example 8 | $CeO_2$ | 120 | 70 | 15 | 13 |
| Example 9 | $Al_2O_3$ | 100 | 5 | 2 | 10.1 |
| Example 10 | $SiO_2$ | 110 | 5 | 3 | 10.2 |
| Example 11 | $TiO_2$ | 110 | 5 | 2 | 10 |
| Example 12 | $ZrO_2$ | 100 | 5 | 2 | 10.1 |
| Example 13 | $Y_2O_3$ | 100 | 5 | 3 | 10.2 |
| Comparison example 1 | Zr alloy | | | | 20 |
| Comparison example 2 | — | — | 100 | 2 | 19.5 |
| Comparison example 3 | — | — | — | — | 20 |

As shown in Table 1, in the comparison examples 1 to 3, a temperature change $\Delta T$ is 19.5 to 20° C. On the other hand, $\Delta T$ in the examples 1 to 13 is 10 to 13° C. and is remarkably low compared to the comparison examples 1 to 3. It is apparent from the above result that the gas trapping materials of the examples have high heat insulation property compared to the gas trapping materials of the comparison examples. It is considered that, in the examples, with the use of the gas trapping material, a gas in the vacuum heat insulation multi-layered glass panel is trapped and hence, a degree of vacuum of a gap portion is enhanced compared to the comparison examples. It is considered that, in the comparison example 1, a gas trapping effect is dissipated due to heat treatment in an air atmosphere. It is proved from the result of the comparison example 2 that the use of silver alone is not effective, and the gas trapping material has a high gas trapping characteristic since silver is contained in cerium oxide.

From the results of the example 1 and the examples 9 to 13, even when aluminum oxide, silicon oxide, titanium oxide, zirconium oxide, or yttrium oxide is used in place of cerium oxide as porous metal oxide, the gas trapping material exhibits substantially the same advantageous effect as cerium oxide.

As has been explained heretofore, according to the present invention, a gas trapping material can be activated at a low temperature of 300° C. or below. Further, even when a gas is released in a baking step or a sealing step in an air atmosphere, a high gas trapping characteristic can be maintained and hence, it is possible to provide a vacuum equipment gas trapping material and vacuum equipment which can enhance production efficiency.

The present invention is not limited to the abovementioned examples, and includes various modifications. For example, the abovementioned examples are described in detail for facilitating the understanding of the description of the present invention and hence, it is not always necessary that these examples include all constitutional elements described in the respective examples. Further, it is possible to replace a part of the configuration of one example with the configuration of another example, and it is also possible to add the configuration of another example to the configuration of one example. Further, the addition, the deletion, or the replacement of another configuration is conceivable with respect to a part of the configuration of each example.

LIST OF REFERENCE SIGNS

1: first substrate
2: second substrate
3: spacer
4: sealing portion
5: gap portion
6: heat reflecting film
7, 300: gas trapping material
8: low-melting point glass
9: low thermal expansion filler particle
10: glass bead
13: exhaust hole
14: exhaust pipe
15: dispenser
16: sealing material paste
17: sealing material
18: heat resistant clip
19: vacuum evacuation furnace
20: electric heater
21: vacuum pump
301: porous metal oxide
302: silver particle
303: pore

What is claimed is:

1. A vacuum heat insulation equipment comprising:
a pair of substrates disposed in an opposedly facing manner with a gap formed therebetween;
a sealing material provided for adhering the pair of substrates to each other; and
a gas trapping material disposed in the gap, the gas trapping material containing porous metal oxide having an average particle size of 10 nm to 100 μm inclusive and silver particles having an average particle size of 0.5 nm to 100 nm inclusive,
the porous metal oxide being larger than the silver particles, and the silver particles being carried by the porous metal oxide,
a content of the silver particles being 1 mass % to 70 mass % inclusive,
a specific surface area of the porous metal oxide being 30 $m^2/g$ or more.

2. The vacuum heat insulation equipment according to claim 1, wherein the sealing material contains a low-melting point glass.

3. The vacuum heat insulation equipment according to claim 2, wherein the low-melting point glass contains vanadium oxide and tellurium oxide.

4. The vacuum heat insulation equipment according to claim 1, wherein the vacuum heat insulation equipment is a vacuum heat insulation multi-layered glass panel.

5. The vacuum heat insulation equipment according to claim 1, wherein an average particle size of the porous metal oxide is 5 nm to 200 μm inclusive.

6. The vacuum heat insulation equipment according to claim 1, wherein the porous metal oxide contains cerium oxide.

7. The vacuum heat insulation equipment according to claim 1, wherein the gas trapping material traps $O_2$, $CO_2$ and moisture.

\* \* \* \* \*